Nov. 27, 1923.

C. DE GRAAF, JR., ET AL 1,475,547

WEIGHING APPARATUS

Filed March 30, 1921  3 Sheets-Sheet 3

Patented Nov. 27, 1923.

1,475,547

UNITED STATES PATENT OFFICE.

CORNELIS DE GRAAF, JR., AND EDUARD BURMAN, OF ROTTERDAM, NETHERLANDS, ASSIGNORS TO MAATSCHAPPIJ TOT VERVAARDIGING VAN SNIJMACHINES VOLGENS "VAN BERKEL'S PATENT" EN VAN ANDERE WERKTUIGEN, OF ROTTERDAM, NETHERLANDS, A LIMITED LIABILITY COMPANY OF NETHERLANDS.

WEIGHING APPARATUS.

Application filed March 30, 1921. Serial No. 457,021.

*To all whom it may concern:*

Be it known that we, CORNELIS DE GRAAF, Jr., and EDUARD BURMAN, both citizens of the Kingdom of the Netherlands, residing at Rotterdam, in the Province of South Holland, Kingdom of the Netherlands, have invented certain new and useful Improvements in Weighing Apparatus, of which the following is a specification.

The invention relates to weighing apparatus and has for its first object an arrangement, whereby with one and the same apparatus wares may be freely and easily weighed by two shop-assistants simultaneously, without the working of one scale being influenced by that of the other.

It has already been proposed (see amongst others the British spec. 7927 A. D. 1900) to secure to the standard or base of a large scale an auxiliary smaller scale adapted to weigh smaller quantities. This arrangement is however not such that the two scales can be used simultaneously by two different persons.

Another object of the present invention is to provide efficient means for increasing the weighing capacity of the apparatus.

According to our present invention the first mentioned object is attained by securing to the central upright of a weighing apparatus two single or double divided indicating scales, each having a pointer moving thereover, said pointers being connected respectively to the beams of two load supports arranged at opposite sides of the upright and adapted to work independently of each other.

According to another feature of our invention said arch-shaped indicating scales are preferably arranged one below the other, the concave sides of the scales pointing inwardly.

The second object of the present invention is obtained by providing the weighing apparatus with a loose counterweight, suspended by means of trunnions from recesses formed in a double crank, adapted to be rotated from without, said crank, when rotated leaving said counterweight in suitable recesses of a forked member, secured to the beam. According to the invention, in rotating the shaft of the double crank a quadrant may be moved along the inner face of a divided indicating scale, whereby other numbers appear behind the apertures of said scale.

When the shaft of the double crank is rotated in order to bring the counterweight to the beam, a second crank, placed below the other end of said beam, may be carried along in such a way, that the beam is brought into the zero-position and (or) is kept therein, until the counterweight rests with its trunnions in the recesses of the forked member secured to the beam, whereupon, when the rotation of the said shaft and therefore of the second crank is continued the beam becomes again free.

In order that our invention may be more readily understood, it will be hereinafter described with reference to the appending drawing, in which.

Figure 1:
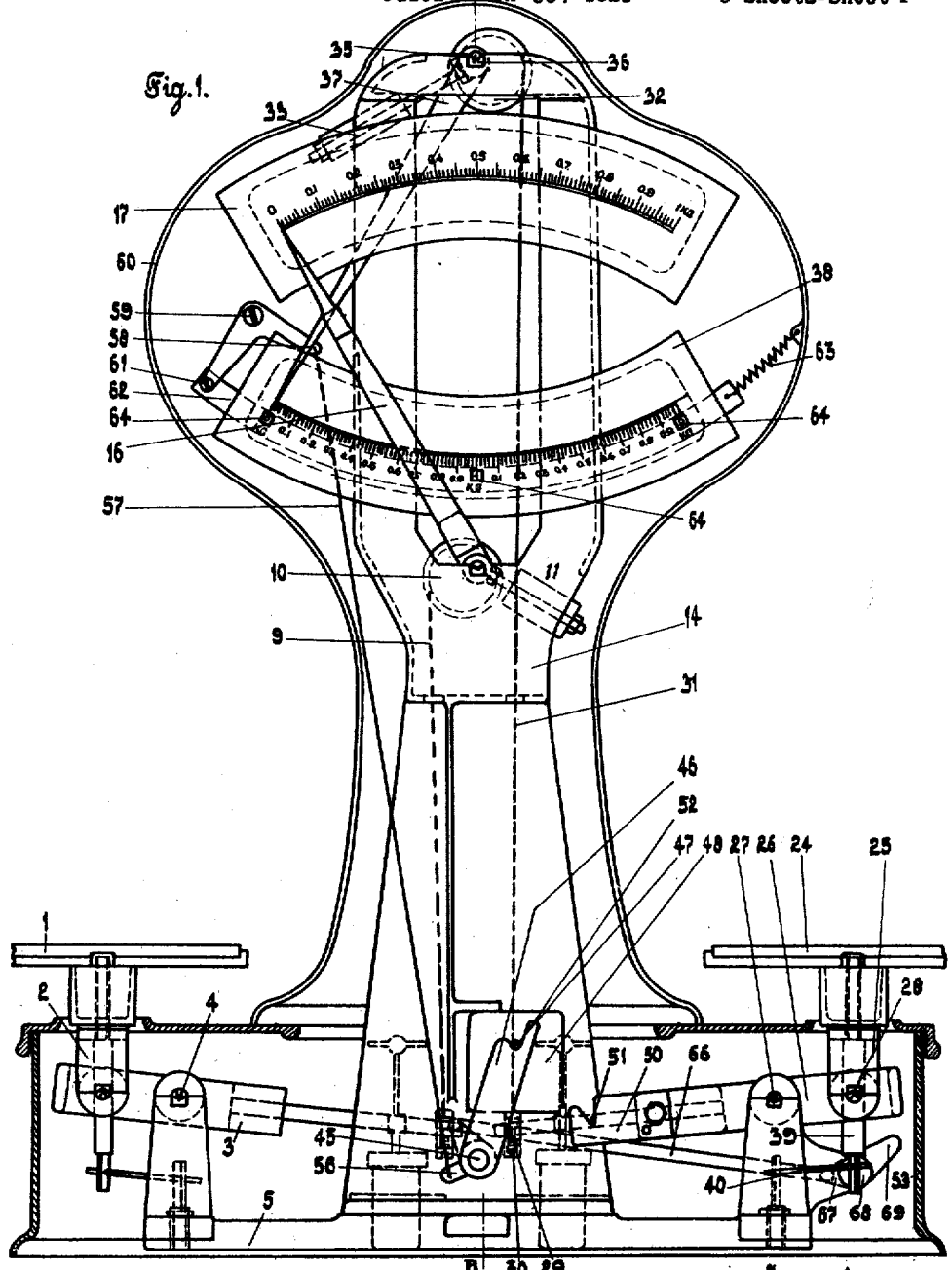
Fig. 1 shows a front elevation, partially in section of a double weighing apparatus according to the invention, part of the casing being broken away.

The improved weighing apparatus has two load supports 1 and 24, respectively resting on beams 3 and 26 by means of supports 2 and 25, said beams being adapted to oscillate about two knife-edges, 4 and 27.

The inner end of the beam 3 acts upon a thin steel wire 9, running in a peripherical groove of an eccentric disc 10, the latter being secured to the shaft of a double pointer 16 with counterweight 11. The pointer 16 moves over divided indicating scales 17.

Figure 2:
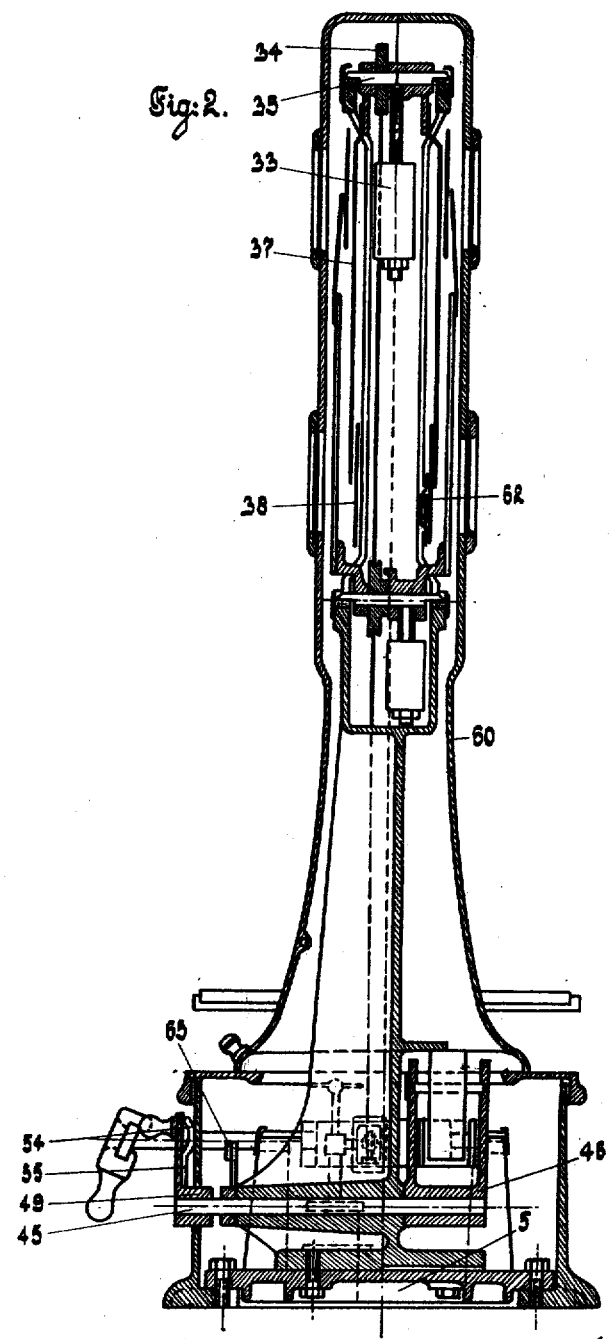
Fig. 2 is a vertical section on the line A—B in Figure 1.

The inner end of the beam 26 acts upon a thin steel wire 31, running over an eccentric disc 32, secured to the shaft of a second double pointer with counterweight, said second pointer 37, moving over indicating scales 38, arranged below the scale 17. The way in which the two pointers are arranged with respect to the scales and to each other, is shown in Fig. 2.

By locating the two load scales at opposite sides of the central upright, the upper part of which carries the two indicating scales and co-acting pointers, a simple weighing apparatus is obtained which may be simultaneously used by two persons without interference.

In Fig. 1 the right-hand scale 24 is provided with means for increasing the capacity of the weighing apparatus. As already stated above, said scale 24 rests upon a metal support 25 carried by the beam 26, the latter being supported on a pivot 27, secured to the base 5.

The pivots 27 and 28 of these parts consist of knives and cushions. To the inner end of the long arm of the beam 26 a centre 29 is secured, resting in a centre holder 30, attached to the lower end of the thin steel wire 31, the upper end of which is secured to the eccentric disc 32 fixed on the shaft of the counterweight or pendular 33, a groove 34 being provided in the circumference of said disc, in which said wire is guided. The disc 32 and pendular 33 are supported by a knife 35, resting in cushions 36, secured to the top of the upright 14. As already said the pendular 33 carries a double pointer 37, moving over divided indicating scales 38.

The support 25 of the load support 24 is provided with a downwardly extending arm 39, which by means of a coupling rod 40 is movably connected to the base 5.

This arrangement serves to effect the parallel motion of the scale.

On one end of a shaft 45 extending transversely through the upright 14, a double crank 46 is secured, having recesses 47 made therein, in which by means of the trunnions a mass 48 may be suspended in case a load has to be weighed, falling within the small weighing limits. When a heavier load has to be weighed, the shaft 45 by means of a handle 49 firmly secured to the other end of said shaft is rotated until the mass 48 rests in the forked member 50, the matter being fixed to the long arm of the beam 26.

The forked member 50 is also provided with recesses 51 preventing the mass 48 from changing its position during the up and down movement of the scale.

When the mass 48 rests in the forked member 50, the crank 46 is rotated by means of the handle 49 to such an extent, that the mass 48 comes free therefrom. In order to put the mass 48 out of action the shaft 45 is rotated in opposite direction, whereby the long end 52 of the crank 46 takes up the mass, so that the latter rests again in the recesses 47 of the crank 46. In the front face of the case 53 two openings 54 are formed, keeping the handle 49 in its proper position by means of a blade spring 55.

The crank 46 is provided with a projection 56 to which a thin steel wire 57 is secured, connected to one arm 58 of a bell crank lever 59, pivotally secured to the casing 60. The other arm 61 of the bell crank lever 59 carries a quadrant 62, which when the mass 48 is placed in the forked member 50 serves to readably change the number of kilograms indicated on one of the scales 38.

By means of a spring 63, secured to the casing 60, the quadrant 62, when the mass 48 is put in, is displaced, whereby before the openings 64, provided in the scale 38 larger numerals appear. When the mass 48 is again put out of action, the steel wire 57 by means of the bell crank lever 59 returns the quadrant 62 to its former position.

Figure 3:
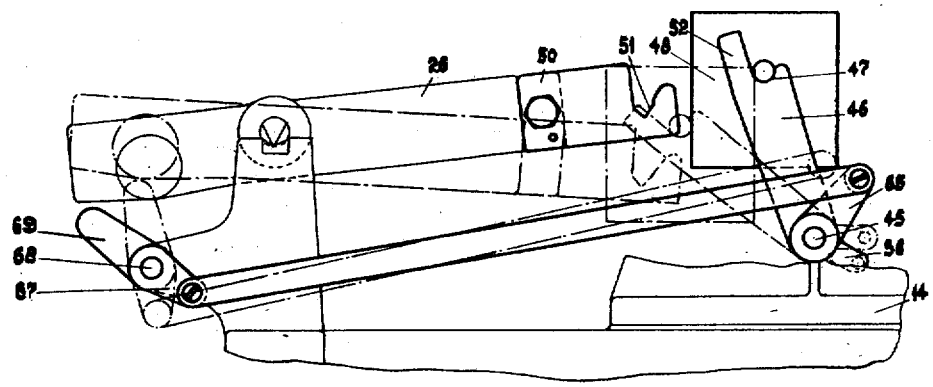
Fig. 3 shows a few details of the mechanism on an enlarged scale.

In order to insure a smooth operation of transferring the weight 48 from the crank 46 to the beam 26, a crank 65 is placed on the shaft 45, said crank being pivotally connected by means of a rod 66 to a bell crank lever 67, having a fixed pivot 68 in the base 5. When the handle 49 is actuated one arm 69 of said bell crank lever 67 first presses against the short end of the beam, so that it is lifted (see the dotted lines in Fig. 3) and the long end of the beam 26 is moved downwards, whereupon the mass 48 is put in. When the mass 48 is put in, the rotation of the handle is continued, till the crank 46 is free from the mass 48. In this case the arm 69 of the bell crank lever 67 is also free from the beam 26 so that the latter can oscillate freely.

What we claim is:

1. Weighing apparatus of the type described, comprising two load supports, a plurality of indicating scales for each load scale facing in different directions, a pointer for each indicating scale and translating mechanism between the two load scales and the respective pointers affording independent operation of the two scales and reading of the indicating scales co-operating therewith from different directions.

2. Weighing apparatus of the type described, comprising an upright, two load supports on opposite sides of the post, two pairs of indicating scales facing in different directions, each pair including a scale co-operating with one of said load scales and a scale co-operating with the other load scale, a pointer for each indicating scale and translating mechanism between each load scale and the respective pointers affording independent operation of the two scales and reading of the indicating scales co-operating therewith from different directions.

3. Claim according to claim 1 in which the indicating scales co-operating with one load scale present their concave edges upwardly and the indicating scales co-operating with the other load scale present their concave edges downwardly, the pointers being pivotally supported at the center of curvature of the respective scales.

4. Claim according to claim 3 in which the scales facing in the same direction are disposed in approximately the same vertical plane.

5. In weighing apparatus, the combination with a load scale and its beam, of a counterweight, means for transferring the counterweight from a position of inactivity upon the beam and vice versa and mechanism connected with the transferring means for acting upon the beam to determine its position during the transfer.

6. Apparatus according to claim 5, in which the said mechanism is constructed and arranged to bring the beam into a predetermined position before the transfer is effected and to maintain it in such position until the transfer is effected.

7. In weighing apparatus, the combination with a load scale and its beam, of a counterweight, a carrier for the counterweight pivotally mounted adjacent the end of the beam for movement in the plane of movement of the beam, the carrier being constructed to normally support the counterweight out of contact with the beam and to deposit the counterweight upon the beam when moved about its pivot in one direction and mechanism connected with the carrier for bearing upon the beam to bring it into the proper position during the transfer to or from the carrier, said mechanism being constructed and arranged to leave the beam free to move when the weight is either in its normal position on the carrier or in operative position on the beam.

In testimony whereof, we affix our signatures.

CORNELIS DE GRAAF, JR.
EDUARD BURMAN.